United States Patent
Westaway

[15] 3,680,104
[45] July 25, 1972

[54] PHASE REVERSAL PULSE MODULATOR AND PULSE COMPRESSION FILTER FOR A COHERENT RADAR

[72] Inventor: Thomas A. Westaway, Provo, Utah

[73] Assignee: The United States of America as represented by the Secretary of the Navy

[22] Filed: July 22, 1970

[21] Appl. No.: 57,262

[52] U.S. Cl. ..................................343/17.2 PC, 343/5 DP
[51] Int. Cl. .........................................................G01s 9/233
[58] Field of Search ....................343/5 DP, 17.2 R, 17.2 PC, 343/17.5

[56] References Cited
UNITED STATES PATENTS

| | | | |
|---|---|---|---|
| 3,090,953 | 5/1963 | Frank | 343/17.2 PC |
| 3,217,324 | 11/1965 | Adamsbaum et al | 343/17.2 PC X |
| 3,223,999 | 12/1965 | Groginsky | 343/17.2 R X |

*Primary Examiner*—Malcolm F. Hubler
*Attorney*—R. S. Sciascia and Thomas O. Watson, Jr.

[57] ABSTRACT

A coherent, 13 bit phase reversal pulse modulator and pulse compression filter for increasing the range resolution of a coherent radar. The transmitted pulse is subdivided into equal duration bits, and as the pulse is being formed each bit may or may not be shifted in phase determined by a digital code generator. The range resolution of which this pulse reversal modulated pulse is capable is achieved by processing the radar return signal in an approximation to a matched filter.

10 Claims, 11 Drawing Figures

PHASE REVERSAL PULSE MODULATOR AND PULSE COMPRESSION FILTER FOR A COHERENT RADAR

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The present invention relates to a pulse modulator and filter for a coherent radar and more particularly to a phase-reversal pulse modulator and pulse compression filter for providing good range resolution for a peak power limited radar.

Two pulse radar requirements are long range and good range resolution. To achieve long range in a peak power limited radar, it is necessary to transmit a long pulse at the peak output power of the transmitter. This is necessary because the maximum range of a radar is dependent on the amount of energy transmitted. Thus in a peak power limited radar, the amount of energy transmitted can be increased only by increasing the duration of the signal transmitted. For good range resolution, or the ability to distinguish between closely spaced targets, it is necessary to transmit a signal whose autocorrelation function has a short duration response. The duration of this response decreases as the bandwidth increases. The historical approach to achieve good range resolution was to narrow the transmitted pulse duration which increased the bandwidth of the information transmitted. In a peak power limited radar, a more desirable approach would be to retain the long pulse duration and transmit the wide pulse width of the narrow duration pulse by suitable modulating the transmitted signal. If the reflected signal is applied to a device that performs autocorrelation, target resolution corresponding to the wide transmitted bandwidth is realized. In performing autocorrelation on the reflected signal, we are also attempting to maximize the signal-to-noise ratio at the output of the autocorrelation device. A device which maximizes the output peak signal-to-noise ratio is called a matched filter. Any radar system transmitting a long duration pulse which has been suitably modulated to provide a good range resolution can achieve no greater maximum range than a radar system transmitting a short duration pulse with the same resolution and amount of energy as the longer duration pulse.

Given the following equation for a gated sine $$s(t) = [u(t) - u(t - T_p)] A \sin(\omega t - \phi)$$
$$u(t) = \begin{cases} 1, t > 0 \\ 0, t < 0 \end{cases}$$
$$u(t - T_p) = \begin{cases} 1, t > T_p \\ 0, t < T_p \end{cases}$$

wave where $A$ equals the maximum value of sine wave; $\omega$ equals the radian frequency of the sine wave; $t$ equals time; $\phi$ equals the phase shift in radians; and $T_p$ equals the pulse duration we see that there are three parameters which can be varied for a given pulse duration. They are $A$, $\omega$ and $\phi$. Since we are interested in transmitting the most energy possible from a peak power limited radar, $A$ must be a constant. That means we are left with frequency $\omega$ and phase $\phi$ to vary during the pulse duration to achieve a wide bandwidth signal.

The method disclosed in this invention for obtaining good range resolution is phase ($\phi$) modulation, and in particular, phase reversal modulation of the pulse carrier frequency. The disclosure also describes a pulse compression filter which effectively performs autocorrelation (or cross correlation if the reflected signal is distorted) on the phase reversal modulated (hereinafter called phase coded) pulse.

In the phase coding method of achieving a wideband signal, as shown in the present invention, the transmitted pulse is subdivided into equal duration bits. Then as the pulse is being formed, the pulse carrier frequency in each bit may be given either 0° or 180° of phase shift corresponding to the binary digits 1 or 0 for that bit as determined by a digital code generator. The range resolution of which this phase reversal modulated pulse is capable is achieved by processing the radar return signal in an approximation to a matched filter. This approximation consists of a tapped delay line where there are the same number of taps as bits in the modulated pulse. The spacing between taps is the same as the bit duration. Each tap is in series with a circuit which multiplies the tap signals by either +1 or −1. The effect of multiplying a bit with 0° phase shift by −1 is to give it 180° phase shift. Multiplying a bit by 180° phase shift by −1 gives the bit 0° phase shift. Multiplication of a bit by +1 leaves it unchanged. Whether the multiplying circuit in each tap is +1 or −1 is determined by the phase coding of the corresponding bit in the time inverted transmitted pulse. The output of the multiplying circuits are summed to form the output of the filter. When the returned pulse is completely contained in the delay line, then each bit in the pulse is being tapped off and multiplied by +1 or −1 so will all bits appear at the summing junction with 0° phase shift and add constructively to form a compressed pulse with the same width as a bit in the phase coded pulse. This approximation to a matched filter is called a pulse compression filter. The improvement in the signal-to-noise ratio at the output of the pulse compression filter approaches the theoretical signal-to-noise improvement for the coherent integration of N pulses. In this case N equals the number of bits in the coded pulse.

The 13-bit phase coder and pulse compression filter described in the invention has a bit duration of 0.1 microseconds. The measurement of range is a measurement of the amount of time between a transmitted pulse and its echo. This round trip delay time is given by the equation:

$$T_d = 2R/C$$

where $T_d$ = time delay
$R$ = range
$C$ = speed light which = $3 \times (10^8)$ meters per second or approximately $1,000 \times (10)^6$ feet per second The incremental amount of time, $\Delta T_d$, to make the round trip $2\Delta R$ is thus:

$$\Delta T_d = (2\Delta R)/C$$

or $$\Delta R = \left(\frac{C}{2}\right) \Delta T_d$$

If the amount of time required between the leading edges of two echo pulses is 0.1 microseconds, in order to resolve them as two echos, then Thus for a phase coded system with a 0.1 microsecond bit duration, the range resolution, $\Delta R$, is approximately 50 ft.

SUMMARY OF THE INVENTION

The present invention offers many improvements over the shortcomings and weaknesses of similar prior art devices in that it discloses a phase reversal pulse modulator and pulse compression filter which materially increases the range resolution of a coherent radar. By subdividing the transmitted pulse into 13 equal duration bits, shifting the bits according to a digital code generator, and then by processing the return pulse according to the same code the operation of a pulse compression matched filter is effectively obtained.

OBJECTS OF THE INVENTION

An object of the present invention is the provision of a phase reversal pulse modulator and pulse compression filter for radars.

Another object of the invention is the provision of a pulse modulator for improving the range resolution of pulse radars.

Still another object of the present invention is the provision of the pulse modulator for achieving long range in a peak power limited radar.

Yet another object of the present invention is to provide a pulse modulator in which the transmitted pulse is subdivided to equal duration bits.

Still another object of the present invention is the provision of a pulse modulator in which the pulse carrier frequency in phase shifted corresponding to binary digits 1 or 0.

Still another object of the present invention is the provision of a pulse modulator in which the phase is shifted according to a digital code generator.

Other objects and many of the attendant advantages of this invention will be readily appreciated as the same becomes better understood by reference to the following detailed description when considered in connection with the accompanying drawings in which like reference numerials designate like parts throughout the figures thereof and wherein.

DESCRIPTION OF THE PREFERRED EMBODIMENT

Figure 1:
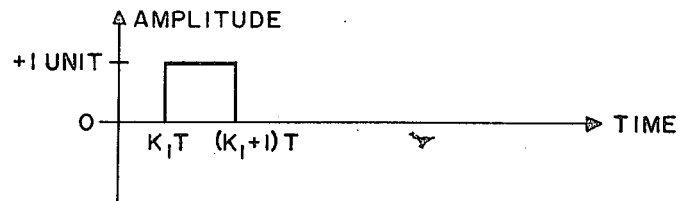
FIG. 1 shows a graphical presentation of a function as +(or +1) bit.
Figure 2:
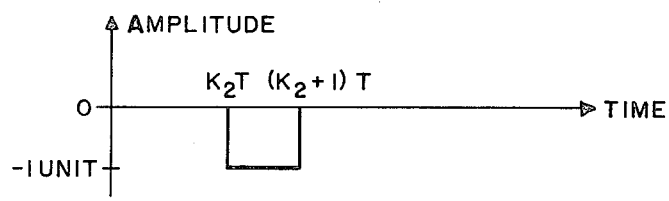
FIG. 2 shows a graphical presentation of a function as a —(or —1) bit.

Referring now to the drawings wherein like reference characters designate like or corresponding parts throughout the several views there is shown in FIG. 1 a graphical presentation of a +1 bit, and it will be noted that the function extends above the line for one unit and extends from $K_1T$ to $(K_1+1)T$ along the time line. Then in FIG. 2 which shows a — bit the same unit extends below the time line this time extending from $K_2T$ to $(K_2+1)T$. Now in FIG. 3 there is shown a three bit coded pulse of +1+1 and —1 are this time there are two units above the line and one unit below the time line.

Figure 3:
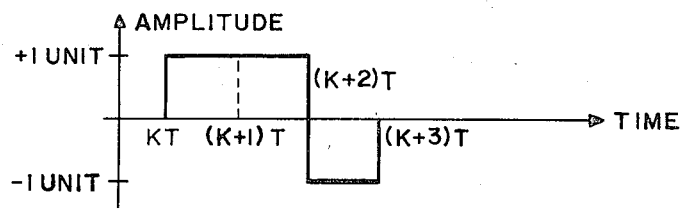
FIG. 3 shows a graphical presentation of a three bit coded pulse of ++—(or +1+1—1).
Figure 4:
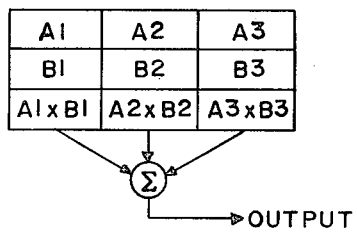
FIG. 4 shows the summing network used for the above three bit coded pulse.

In FIG. 4 there is shown a summing network for the three bit coded pulse as would appear in FIG. 3. The transition horizontally from one column to the next column (A1 to A2, A2 to A3) in the diagram represents the time delay line with A1, A2, and A3 representing the tap out-puts. B1, B2 and B3 represent the multiplying factors for each tap and can be either +1 or —1. After multiplication in each tap, the multiplier outputs are summed to form the output of the pulse compression filter. The values B1, B2, and B3 are determined by time inverting the coded pulse. The time inverted pulse of this case then would be —++. Thus B1=—1 and B2=B3=+1.

Figure 5:
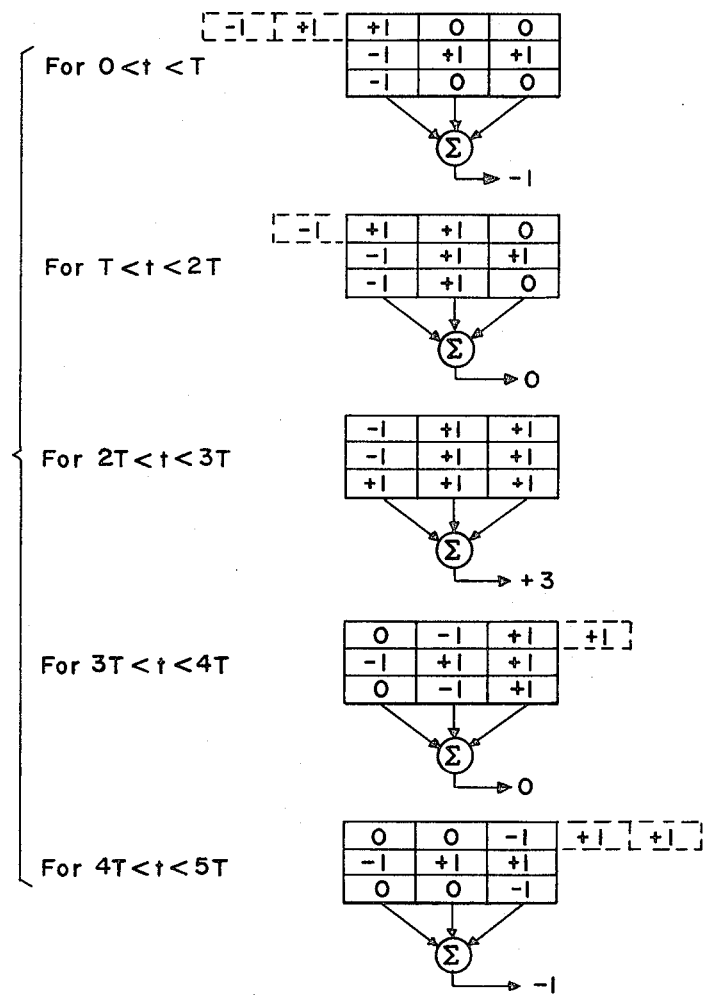
FIG. 5 shows a graphical presentation of the sequence of events as the coded pulse passes through the pulse filter.

In FIG. 5 there is shown a series of diagrams indicating the sequence of events as the coded pulse passes through the pulse compression filter.

Figure 6:
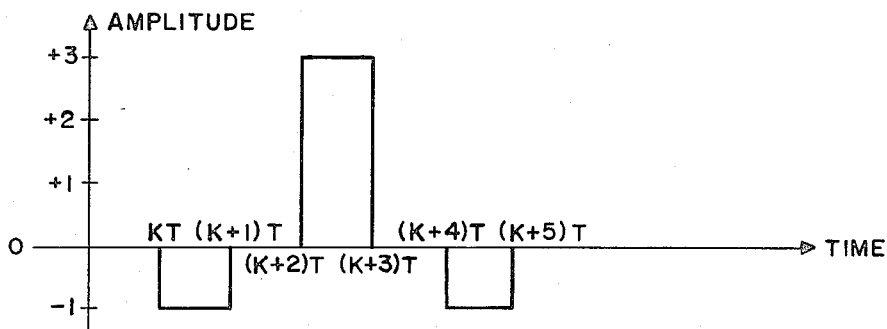
FIG. 6 is a graphical presentation of the output of the summing network.

In FIG. 6 there is shown graphically how the outputs as presented in FIG. 5 would appear, and it can be seen that the first output of —1 is one unit below the line, then the second one is 0, followed by a third which has a +3 amplitude, followed by a fourth which is 0, and then closing with a fifth output of —1.

Figure 7:
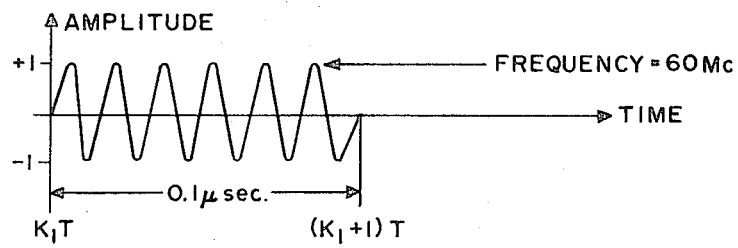
FIG. 7 shows a presentation of a positive bit.
Figure 8:
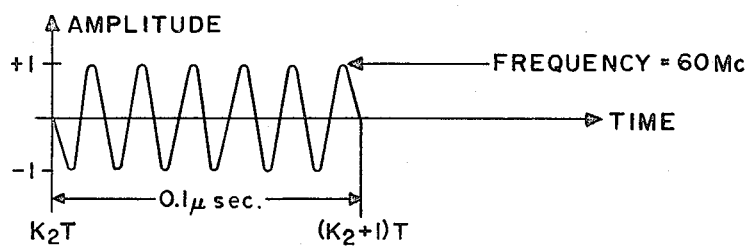
FIG. 8 shows a presentation of a negative bit.

In FIG. 7 there is shown graphically what the output of a + bit from the transmitter would be like, and it is seen that the graph starts from 0, increases in a positive direction to a +1 amplitude, then reverses to a —1 amplitude and continues along the time line for a 0.1 microsecond time span. The reverse is shown in FIG. 8 and in this case the initial line starts from 0 and goes in a — direction to —1, then reverses to a +1 amplitude, and also continues for a 0.1 microsecond time span. The difference between the + and the — bits being that the — bit is 180° out of phase with the + bit.

Figure 9:
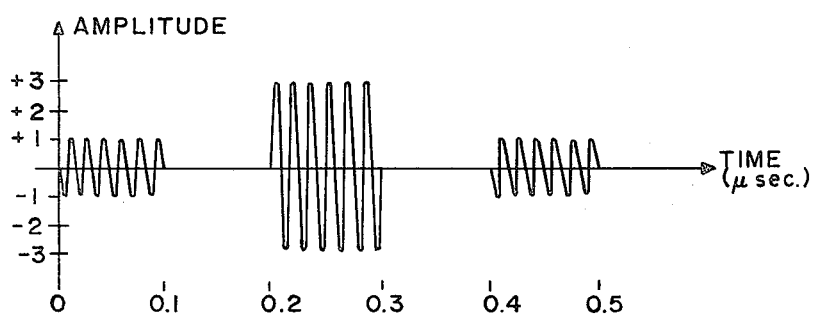
FIG. 9 shows the output of the pulse compression filter as a function of time.

Thus with the only difference between the + and — bits being the sign, it is seen that multiplying either of them by —1 will change the sign or the phase by 180°. Multiplying either by +1 will leave the bit unchanged. Thus the preceeding explanation of the three bit pulse compression still holds and the output of the pulse compression filter as a function of time will be represented in FIG. 9.

Figure 10:
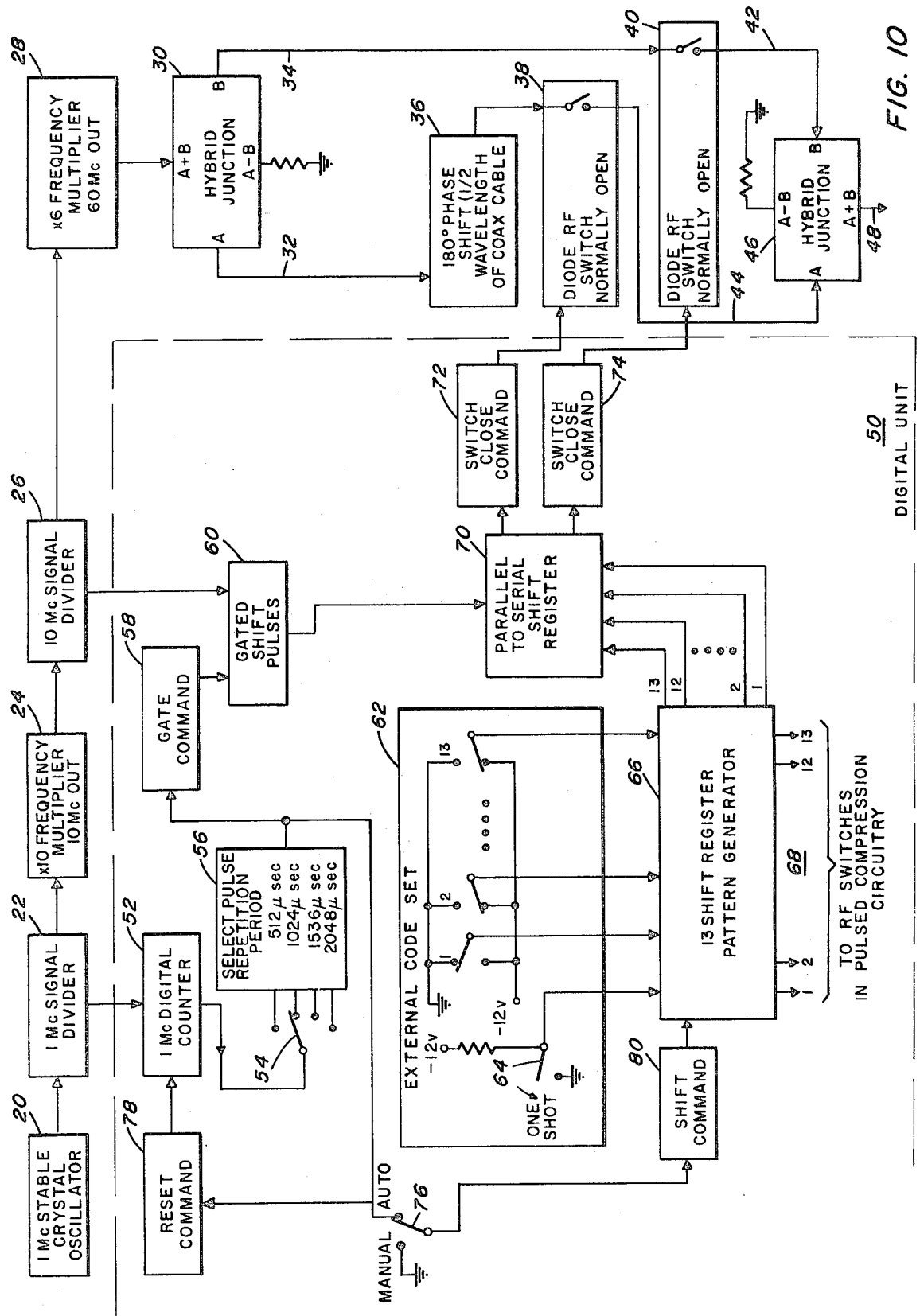
FIG. 10 shows a block diagram of the pulse coding circuitry.

Referring to FIG. 10 there is now shown a block diagram for the pulse coding circuitry such as would be used to have the transmitted pulse subdivided into equal duration bits. A 1 megacycle stable crystal oscillator 20 is connected to a 1 megacycle signal divider 22, one output of which goes to a 10 power frequency multiplier 24, this in turn feeding a 10 megacycle signal divider 26. One output from the divider 26 is applied to a 6 power frequency multiplier 28 which delivers an output of 60 megacycles, this output being applied to a hybrid junction 30. One output of hybrid junction 30 is produced at 32, this output being impressed upon a 180° phase shifter 36, and after the signal is shifted by 36 it is applied to a diode RF switch 38 which in its deenergized state is normally open. A second output 34 from hybrid junction 30 is applied as an input to a second diode RF switch 40, this switch likewise in its deenergized state being normally open. When diode switch 38 is closed it produces an output on lead 44 which is applied as one input to a second hybrid junction 46, the second input to this junction being produced on a lead 42 when diode switch 40 is closed. The output of second hybrid junction 46, which in effect is the summation of the outputs on leads 44 and 42, is produced at a coded pulse output terminal 48.

Within the broken line shown in FIG. 10 there is depicted a digital code generator 50 which not only determines the + or — sign of the subdivided equal duration bits from the transmitted pulse, but it also activates the RF switches in the pulse compression circuitry so that this circuitry will accurately pass the returning waveform bits as they are reflected from a distant target. An output from 1 megacycle signal divider 22 is applied to a digital counter 52, the output of this counter being applied to a stepping switch 54 which is used to select the pulse repetition period of the transmitter as provided by repetition pulse selector 56, the output of this selector being applied to a gate command 58 and then to a gate shift 60. A second input to gate shift 60 is provided from 10 megacycle signal divider 26.

In order to provide a desired pulse code for the transmitter there is provided an external code setter 62 which has a plurality of single pole double throw switches, and in this illustration numbered between 1 and 13 for the 13 bits of the pulser, the switches acting to work between ground and —12 volts.

Also included with external code setter 62 is a momentary close switch 64 which is used to start the sequence of events setting up the encoder as will be described more fully hereinafter. All of the outputs from external code setter 62 are applied to a 13 shift register pattern generator unit 66, which after processing the inputs from the code setter provides two sets of outputs according to the predetermined code. One set of these outputs from pattern generator 66 are applied to RF switches in the pulse compression circuitry as at 68, while a duplicate set of outputs are applied to a parallel-to-serial shift register 70. At the properly appointed time, gate 60 applies a signal to the shift register 70 and outputs from this register 70 are applied to a switch close command 72 and also to another switch close command 74. Switch close command 72 functions to operate diode RF switch 38 while switch close command 74 functions to close diode RF switch 40.

The pulse coding circuitry can operate in either a manual or an automatic mode, the type being determined by a single pole double throw switch 76. When in the automatic mode of operation one side of switch 76 is connected to the reset command 78 and also as another input to command gate 48, and will likewise be connected to a shift command 80 whose output forms another input to the pattern generators 66.

Figure 11:
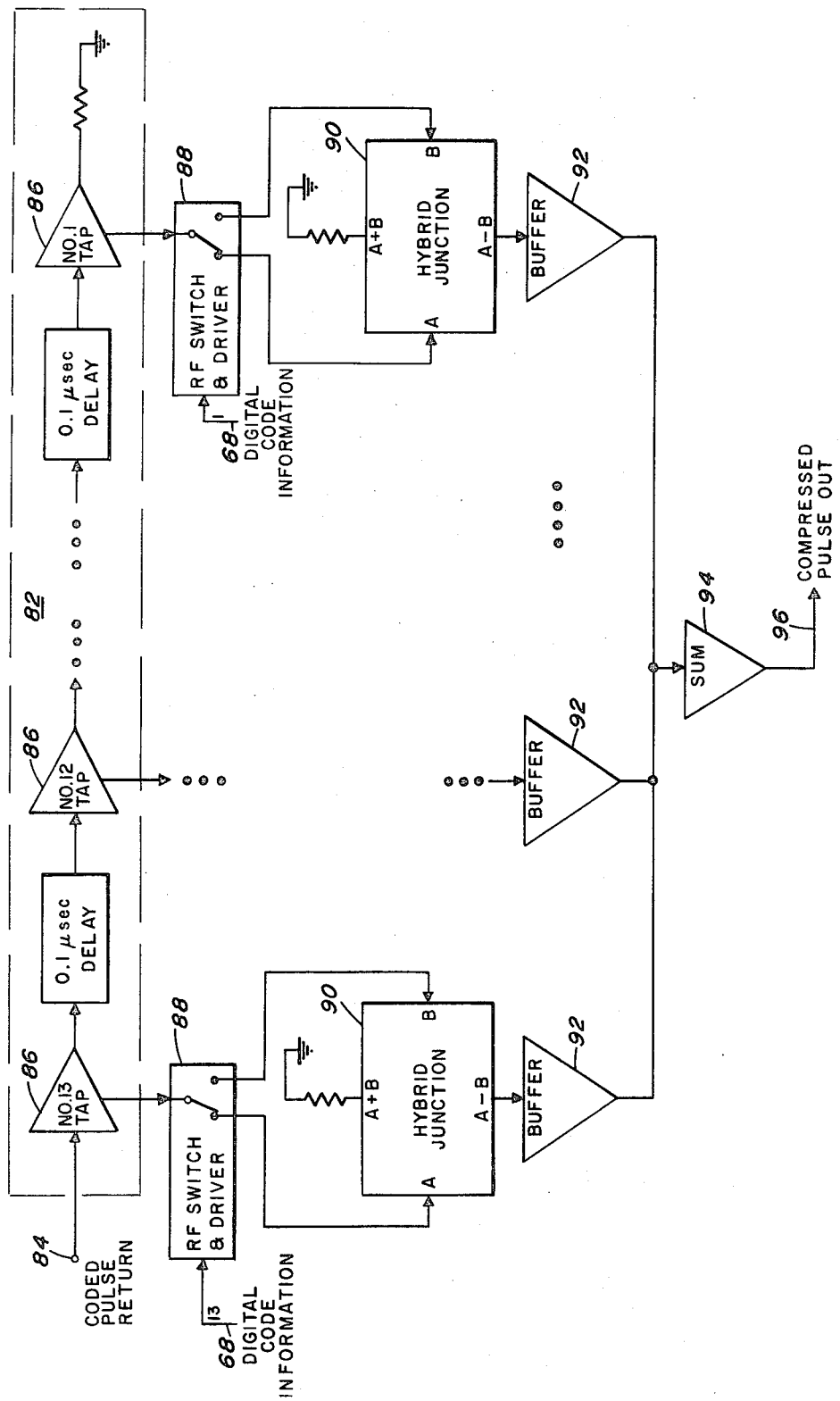
FIG. 11 shows a block diagram of the pulse compression filter.

Turning now to FIG. 11 there is shown a block diagram of the pulse compression filter. This pulse compression filter consists of a delay line 82 which is shown within the dotted lines, this delay line being tapped at 13 points spaced at 0.1 microsecond intervals along the line. The radar return signals in the form of coded pulses are applied to the compression filter at an input terminal 84. Tapping of the delay line is accomplished by inserting an amplifier as at 86 at the proper places in the delay line. These amplifiers (called tap amplifiers) have two outputs, one output of which drives the next section of the delay line while the second output supplies signals to a single pole double throw RF switch as at 88. It should be noted at this point that for the sake of simplicity there are only two channels of the 13 tap points shown in FIG. 11. Digital code information as provided at output 68 from pattern generators 66 are also applied to each of the RF switch and drivers 88 and it may be pointed out again here that the outputs from pattern generator 66 are applied to the delay line in the reverse order in which they were applied to the transmitter. In other words No. 13 is applied to the beginning of the tap line and No. 1 to its end. Two outputs from RF switch and driver 88 are applied to a hybrid junction 90 in each channel, the output of these junctions each being applied to a buffer amplifier 92 before they are all applied to a summing device 94 and a composite compress pulse output is furnished at point 96.

Turning now to the operation of the pulse coding circuitry as shown in FIG. 10, all frequencies needed for timing in digital unit 50 and the 60 megacycle signal from multiplier 28 to be phase coded, are derived from a stable 1 megacycle crystal oscillator 20 which has a stability in the order of plus or minus five parts in 10 to the 10th per day. The stable output from oscillator 20 is in turn applied to signal divider 22 then to multiplier 24 then to signal divider 26 and finally to frequency multiplier 28 which has an output of the desired 60 megacycles. The method of forming the 13 bit, phase coded, pulse uses two diode RF switches. The 60 megacycle signal from multiplier 28 is split equally in a hybrid junction 30 and applied to the input of two RF switches 38 and 40. The signal to one of the RF switches, that is switch 38, must pass through 180° phase shift cable 36 and therefore must travel through one half wave length of cable than the signal to the other switch (diode RF switch 40). Thus the output of switches 38 and 40 will be 180° out of phase. The closing of RF switches 38 and 40, and thus the phase coding, is controlled by digital unit 50 through the operation of switch close commands 72 and 74 respectively. The outputs of switches 38 and 40 are applied to hybrid junction 46 where they are then summed in this hybrid junction to form a 13 bit phase coded pulse. Each bit is 0.1 microsecond in duration and thus the 13 bit pulse will be 1.3 microseconds in duration as produced at output point 48.

The digital pulse unit 50 is constructed in such a way that a 13 bit coded pulse can be formed by entering the desired code on the front panel switches forming a part of external code setter 62, and by using the "one-shot" switch 64 to store the code in the unit. By placing the auto-manual switch 76 in the auto-position, the pulse coding will change automatically from pulse to pulse. For each bit in the 13 bit coded pulse, there is a seven bit binary shift register pattern generator whose cycle length is 127, these 13 shift register pattern generators forming the circuitry for component 66. These registers of component 66 shift once each pulse repetition period when in the auto mode so that they have completed a cycle in 127 pulse repetition periods. The outputs of the 13 shift register pattern generators from component 66 are applied to parallel-to-shift register 70 and by appropriately taking assertion or negation outputs and storing them in this parallel-to-serial shift register 70, a 13 bit Barker CODE (+++++ ‒‒ ++ ‒ +) is formed at the beginning of each pattern cycle. The gated assertion and negation outputs of the final flip flop in the parallel to serial shift register 70 are the control signals for the RF diode switches 38 and 40 which form the phase coded pulse, through the operation of switch close commands 72 and 74. When the gate pulse is not present on gate 60, both control lines (to switch commands 72 and 74) are at 0 volts and the RF switches 38 and 40 are open. When the gate pulse is present, the control lines switch between 0 volts and −12 volts as the code stored in the register is shifted out at a 10 Mc rate. When the control line to RF switch 38 or 40 goes to −12 volts, the switch is closed and RF is allowed to pass. In the auto mode of operation, the RF switches 88 in the pulse compression filter (FIG. 11) receive the new code information and switch the tapped signals to the proper inputs of the hybrid junctions 1 microsecond before the new phase coded pulse begins forming. Thus the pulse compression filter is ready for the newly coded pulse as soon as it is formed.

The pulse compression filter is shown in the block diagram in FIG. 11 and it can be seen that the filter consists of a delay line 82 tapped at 13 points spaced at 0.1 microsecond intervals along the line. Tapping is accomplished by inserting an amplifier, such as 86, with two outputs, into the delay line at the proper place. One output of the amplifier 86 (called a tap amplifier) drives the next section of the delay line and the other output supplies the signal to a single pole double throw RF switch 88. This RF switch 88 directs the signal to one of two inputs to a hybrid junction 90. There are four possible inputs (or outputs) in a hybrid junction. They could be labeled A, B, A+B, and A−B. By applying the tap signal to either the input A or B and taking the output at A−B it is possible to multiply it by +1 or −1. For example, if the signal is applied to B, the output is then 0−B or −1 times the signal at input B. Similarly, by applying the signal to input A and no signal to B, the output will A−0 or +1 times the signal at A. The digital code unit 50 in FIG. 10 determines whether the tap signal is to be applied to input A or B of the hybrid junction in each tap. The A−B output of the hybrid junction is connected to a buffer amplifier 92 and the buffer amplifier outputs are summed in a summing circuit 94 and amplified to form the output of the pulse compression filter as at 96.

From the above description of the structure and operation of the present invention it is obvious that there is disclosed therein a phase reversal pulse modulator and pulse compression filter for radars which provides considerable improvement over prior art radars in that it provides good range resolution and a maximum range for a peak power limited radar.

Obviously many modifications and variations of the present invention are possible in the light of the above teachings. It is therefore to be understood, that within the scope of the appended claims, the invention may be practiced otherwise than as specifically described.

What is claimed:

1. A phase reversal modulator and pulse compression filter for a radar comprising:
   a stable source of pulses;
   frequency multiplier means connected to the source of pulses to provide pulses at a desired frequency higher than the stable source;
   a first hybrid junction for receiving the output of the multiplier and dividing it into two equal outputs;
   a first RF switch connected to one of the hybrid junction outputs;
   a 180° phase shifter connected to the other hybrid junction output;
   a second RF switch connected to the phase shifter so that the inputs of the first and second RF switches are 180° out of phase;
   a digital unit for operating the two RF switches;

a second hybrid junction for combining the outputs from the two RF switches to produce a coded pulse output for the radar; and a pulse compression filter also operated by the digital unit for compressing the radar return pulses.

2. The device of claim 1 wherein the stable source of pulses is a crystal controlled oscillator.

3. The device of claim 2 wherein the digital unit comprises:

means for generating a binary pattern in response to a coded input; and, means connected to said generating means for setting a code into said generating means.

4. The device of claim 3 wherein:

the generating means comprises a binary shift register pattern generator having a plurality of inputs; and, the code setting means comprises a plurality of two position switches, each switch being connected to one of the shift register pattern generator inputs, the positions of the switches determining the code.

5. The device of claim 4 wherein the digital unit includes a parallel to serial shift register connected to the binary shift register pattern generator to produce an output equal sequentially to the output of the generator.

6. The device of claim 5 wherein the digital unit includes a first means to connect the serial shift register to the first RF switch and a second means to connect the serial shift register to the second RF switch, according to the binary output of the serial shift register.

7. The device of claim 6 wherein the pulse compression filter includes:

a delay line having a plurality of sections;

a plurality of tap amplifiers spaced along the delay line, each individual tap amplifier being disposed between two adjacent sections of the delay line, there being the same number of amplifiers as there are bits in the transmitted pulse; and, means to apply a return echo pulse to the front of the delay line.

8. The device of claim 7 wherein the pulse compression filter includes:

an RF switch connected to each tap amplifier;

a hybrid junction connected to each RF switch; and a buffer amplifier connected to each hybrid junction.

9. The device of claim 8 wherein the pulse compression filter includes means to connect each of the RF switches in the filter to a shaft register pattern generator in the binary unit.

10. The device of claim 9 wherein the pulse compression filter includes:

a summing circuit connected to all of the buffer amplifiers; and output means connected to the summing circuit pulse output.

* * * * *